Dec. 6, 1927. 1,651,871

E. F. COLLINS

OVEN

Filed July 30, 1924

Inventor
Edgar F. Collins
by
His Attorney

Patented Dec. 6, 1927.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

OVEN.

Application filed July 30, 1924. Serial No. 729,182.

My invention relates to ovens and has for its object the provision of a simple, reliable and efficient oven in which a substantial part of the heat stored in the articles which have been baked may be conserved and utilized.

More specifically my invention relates to ovens of the conveyor type, such as used for baking japan or enamel coatings on various articles, as for example, parts of automobile bodies. In such ovens it is very desirable, if not essential, that the oven be provided with forced ventilation for the purpose of carrying off the fumes and solvent vapors incident to the baking of the enamel. These fumes and vapors are explosive and furthermore have a detrimental effect on the finish of the baked enamel.

In carrying out my invention I provide a plurality of vertically and horizontally disposed compartments in the oven through which the articles to be baked are passed, the uppermost compartment being heated. I also provide means for producing a flow of ventilating air through the various compartments of the oven in a direction opposite to the movement of the articles, and a recirculation radiator type heater in which the air or other heat transferring medium is controlled independently of the ventilating air.

Figure 1:
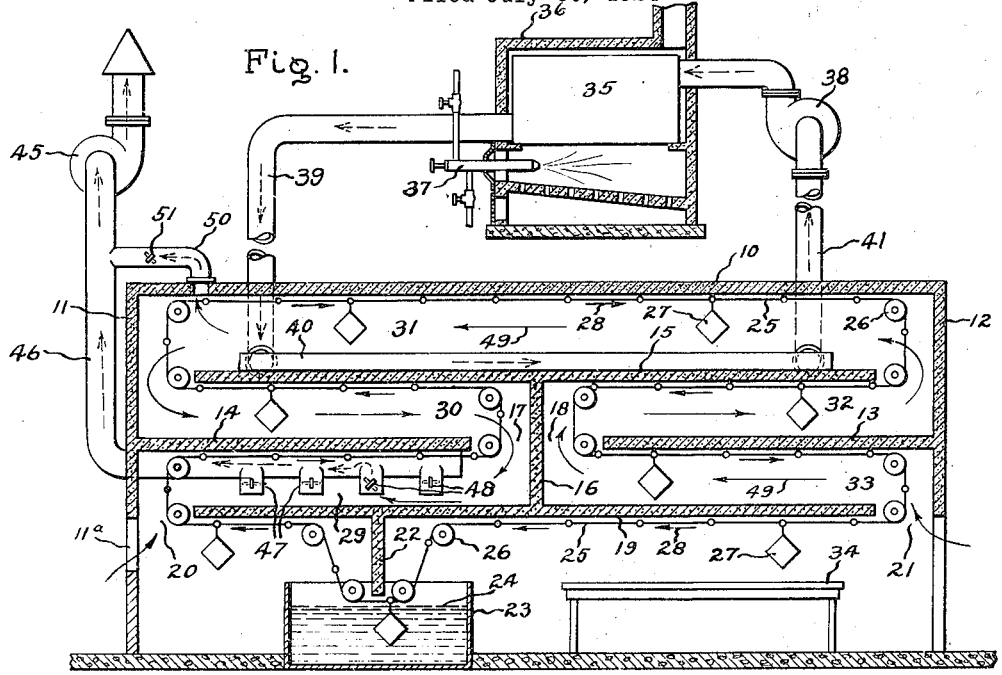
Figure 2:
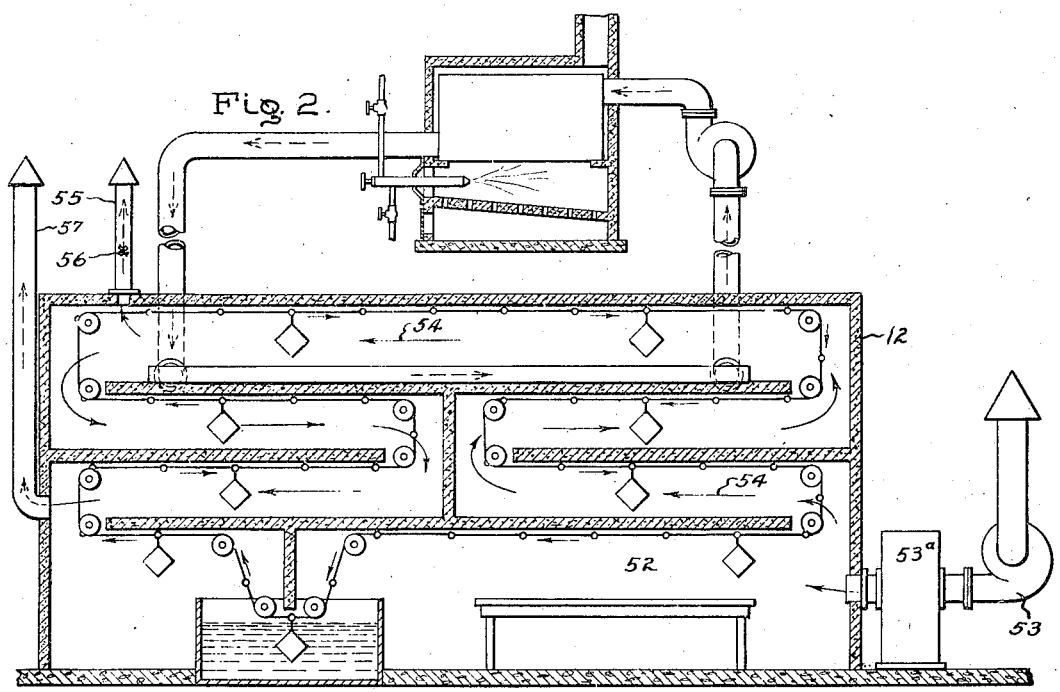

For a more complete understanding of my invention, reference should be made to the accompanying drawing in which Fig. 1 is a vertical sectional view of an oven embodying my invention, while Fig. 2 is a similar view illustrating a modification of my invention.

Referring to Fig. 1 of the drawing, in one form of my invention the oven comprises a top wall 10, end walls 11 and 12, suitable side walls (not shown), and bottom walls 13 and 14 arranged to provide a relatively small opening between their inner ends, this opening being substantially in the center of the oven. The walls are heat insulated. It will be understood that these top, end, side and bottom walls form a closed chamber having a central opening in the bottom through which the articles are passed in and out. Inside this chamber is a horizontal wall 15 which is somewhat shorter than the length of the chamber and has its ends spaced from the end walls 11 and 12. Depending from the wall 15 is a vertically disposed wall 16 which extends downwardly through the opening between the bottom walls 13 and 14 dividing it into two openings 17 and 18. This vertical wall 16 joins a second horizontal wall 19 which is mounted below the bottom walls 13 and 14 and is spaced therefrom. The length of wall 19 is substantially the same as the length of wall 15 and it is likewise centrally disposed so that openings 20 and 21 are formed between its ends and the end walls 11 and 12. Depending from the horizontal wall 19 is a short vertical wall 22 which extends downward into a tank 23 containing a bath 24 of enamel or other material with which the articles are to be coated.

It will be understood that the walls 15, 16, 19, and 22 are heat insulated and joined tightly at their sides with the side walls of the oven. A plurality of vertically and horizontally disposed chambers communicating successively with each other are thus formed. An endless conveyor 25 is led over suitable rollers or pulleys 26 from one chamber to the other, and downward under the wall 22 whereby the articles are dipped in the bath of enamel in the tank 23 before being passed into the oven. This conveyor may be mounted at the tops of the various chambers so that the articles 27 may be hung on it. Assuming that the conveyor is driven, by suitable means (not shown), in the direction indicated by the short arrows 28, it will be observed that the articles will pass into the oven through the opening 20, then through the lowermost chamber 29, upward through opening 17 into the next chamber 30, through this chamber to the left and upward to the uppermost chamber 31 which extends the full length of the oven. After passing through the chamber 31, the articles pass downward into chamber 32, through this chamber and then downward through opening 18 into the lowermost chamber 33, and through chamber 33 and out through the opening 21. A table 34 may be placed near the tank 23 to facilitate the loading and unloading of the conveyor.

The uppermost chamber 31 only is heated. In accordance with my invention I provide a radiator type heater, shown as an oil burning heater, for the chamber 31. This heater comprises a closed receptacle 35 constituting a heat absorber which is mounted within a heat insulating wall 36. Below the absorber 35 is a suitable oil burner comprising a nozzle 37 for introducing a suitable mixture of oil and air into the combustion chamber. Air, steam or any other suitable heat transferring medium is provided in the absorber 35. This medium is preferably air. It is heated in the absorber and caused to circulate by means of a blower 38 from the absorber through a duct 39 into and through a heat radiator 40 of any suitable form which is mounted in the bottom of chamber 31 of the oven. In passing through the radiator the air moves in the same direction as the articles being heated. From the radiator the air is returned through the duct 41 to the absorber 35 where it is again heated and then recirculated through the radiator.

It will be observed that since the circulation of air through the radiator 40 is in the same direction as the movement of the articles through the chamber 31, the articles upon entering the chamber 31 are immediately exposed to heat given off rapidly by the hottest air entering the radiator and are therefore rapidly heated. As the articles continue their journey through chamber 31 heat is transferred to them less rapidly due both to their own increase in temperature and the decrease in temperature of the heating medium. This has the effect of bringing the hottest part of the oven at substantially the middle of chamber 31.

By means of a blower 45 a forced circulation of air is produced through the furnace in a direction opposite to the movement of the conveyor. The blower 45 is connected through a duct 46 with the lower chamber 29, the duct extending into the chamber and being provided with a plurality of inlet openings 47 which may be regulated by suitable dampers 48. The operation of the blower 45 produces a partial vacuum in duct 46 whereby air is drawn into the oven through opening 21 and passed in the direction of the long arrows 49 through the various compartments. By means of this arrangement the cold air entering the oven passes first through chambers 33 and 32 where it comes in contact with the hot articles leaving the oven, whereby the cold air is preheated and the baked articles are cooled. After the air has passed through the heating chamber 31 it will be observed that in passing out of the oven through chambers 30 and 29 it comes in contact with the cold articles entering the oven whereby the cold articles are preheated and the air is cooled. It will thus be observed that heat stored in the baked articles passing out of the oven is utilized in preheating the ventilating air, and heat stored in the ventilating air passing out of the oven is utilized in preheating the cold articles passing into the oven. A duct 50 regulated by means of a damper 51 leads directly from the upper left hand end of the chamber 31 to the pipe 46. The light volatile fumes or gases driven off as the articles first enter the chamber 31 at its left hand end tend to rise to the top of the chamber and are withdrawn through the duct 50.

It will be observed that the wall 22 forms a barrier between the openings 20 and 21 and hence tends to assure the drawing of cold air into the oven through the opening 21. The wall 22 extends downward into the tank 23 in close proximity to the surface of the enamel, sufficient space being left for the passage of the conveyor without dipping into the enamel.

Immediately after the articles emerge from the bath and before they enter the lowermost chamber 29 the heavy volatile vapors of the enamel solvent begin to pass off. In order to draw off these vapors, the dampers in the various inlet openings 47 are so regulated that a small amount of cold air is drawn into the oven through aperture 20, an opening 11$^a$ of suitable size being provided in the left hand end wall 11 to admit this cold air. It will be observed that the flow of heating air through the radiator is entirely independent of the flow of ventilating air through the oven. The heating air and the ventilating air may therefore be separately controlled.

In the modified form of my invention shown in Fig. 2 the construction of the oven is very similar to that shown in Fig. 1 with the exception of the method of producing the circulation of air through the oven. In this modified form of my invention the end wall 12 of the oven is extended downward to form a closed chamber 52 at the point where the articles leave the oven. The blower 53 forces air through a suitable filter 53$^a$ into this chamber under pressure and thereby produces a circulation through the various chambers as indicated by the long arrows 54. This circulation of air is in a direction counter to the movement of the articles being heated, and is substantially the same as that described in connection with Fig. 1. An outlet duct 55 communicating directly with the heating chamber is provided whereby the light volatile fumes may be exhausted directly from the heating chamber. The duct 55 may be regulated by means of a damper 56. From the lowermost chamber of the oven the air is exhausted into a stack 57.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. An oven comprising heat insulating walls forming a compartment having a central opening in the bottom, horizontal and vertical heat insulating walls dividing said compartment into an upper chamber and two separate lower chambers, heat insulated from said upper chamber communicating with said opening and with said upper chamber at opposite ends thereof, heating means for said upper chamber, a conveyor for the articles to be baked passing into the oven through one of said lower chambers then upward and through the upper chamber and finally downward and out through the other lower chamber, and means for producing a current of air through said oven in a direction opposite to the movement of said conveyor.

2. An oven for baking enameled articles and the like, comprising heat insulated walls forming an upper horizontal heating chamber and two sets of horizontal chambers arranged below said heating chamber communicating with opposite ends of said heating chamber respectively, the chambers in each set being arranged one above the other and separated from each other and from said heating chamber by said heat insulated walls, a conveyor for passing articles back and forth and upward through one of said sets of chambers into said heating chamber, through said heating chamber in a horizontal direction, and then out of said heating chamber downward, back and forth through the other set of chambers, means for heating said heating chamber, and means for producing a current of air through said oven, said air being admitted at the point where the heated articles leave said oven.

In witness whereof, I have hereunto set my hand this 29th day of July, 1924.

EDGAR F. COLLINS.